Figure 1:
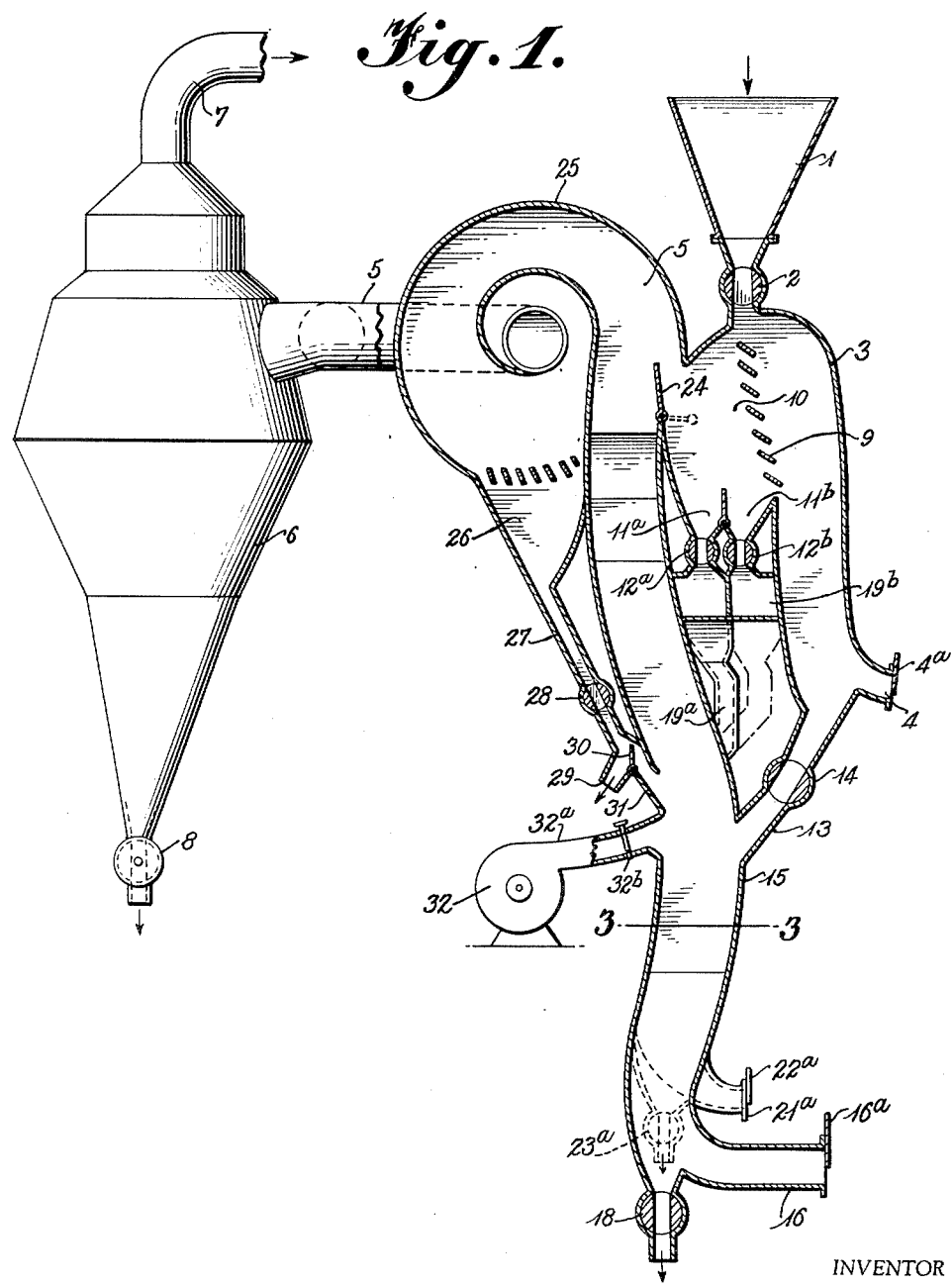

March 29, 1955 E. HARVENGT 2,705,075
DRY DUST FREEING OF COALS AND SIMILAR MATERIALS
Filed Feb. 5, 1951 4 Sheets-Sheet 1

INVENTOR
Edmond Harvengt
BY
ATTORNEY

March 29, 1955     E. HARVENGT     2,705,075
DRY DUST FREEING OF COALS AND SIMILAR MATERIALS
Filed Feb. 5, 1951     4 Sheets-Sheet 2
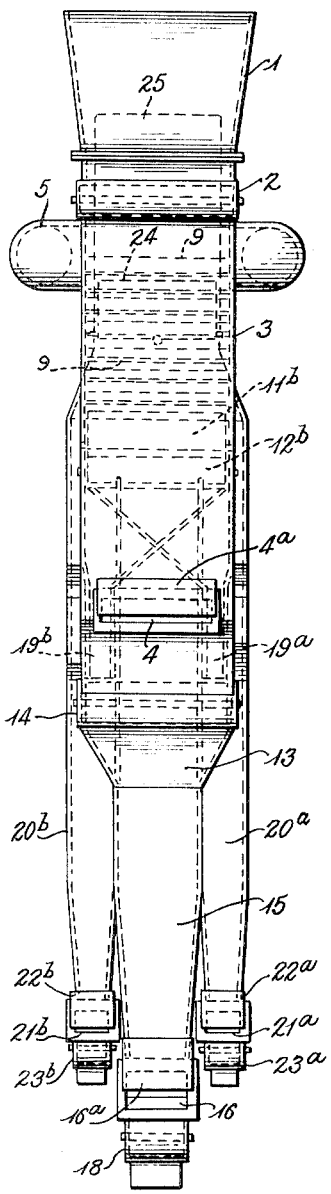
Fig. 2.
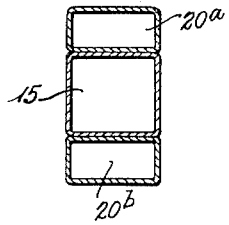
Fig. 3ª.
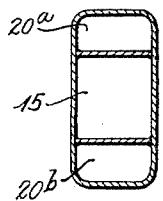
Fig. 3ᵇ.
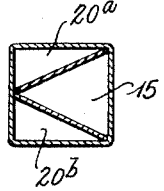
Fig. 3ᶜ.
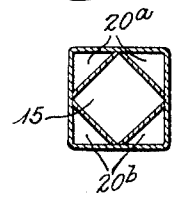
Fig. 3ᵈ.
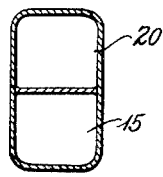
Fig. 3ᵉ.
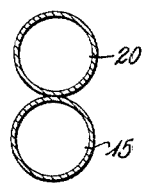
Fig. 3ᶠ.
INVENTOR
Edmond Harvengt
BY
ATTORNEY

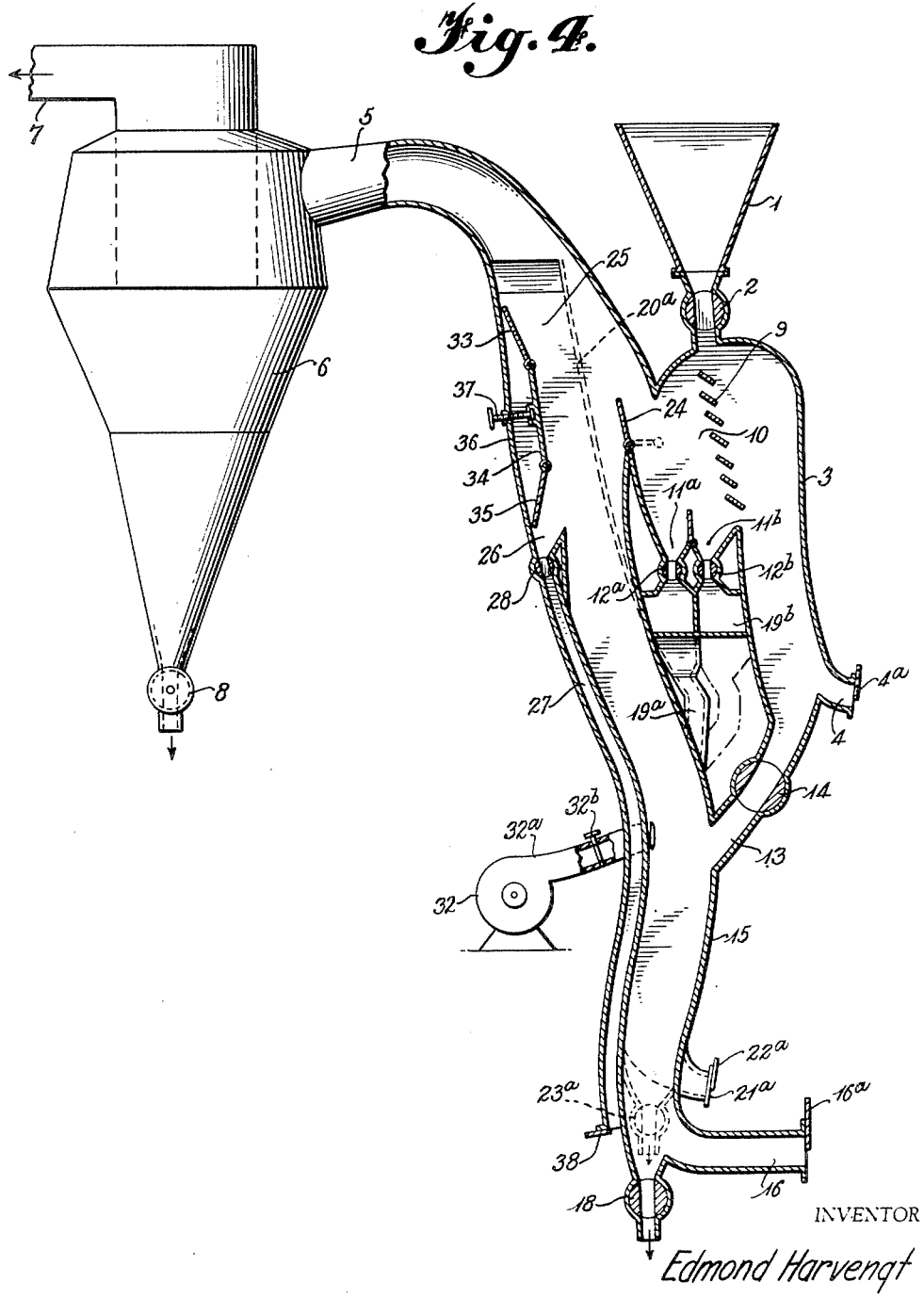

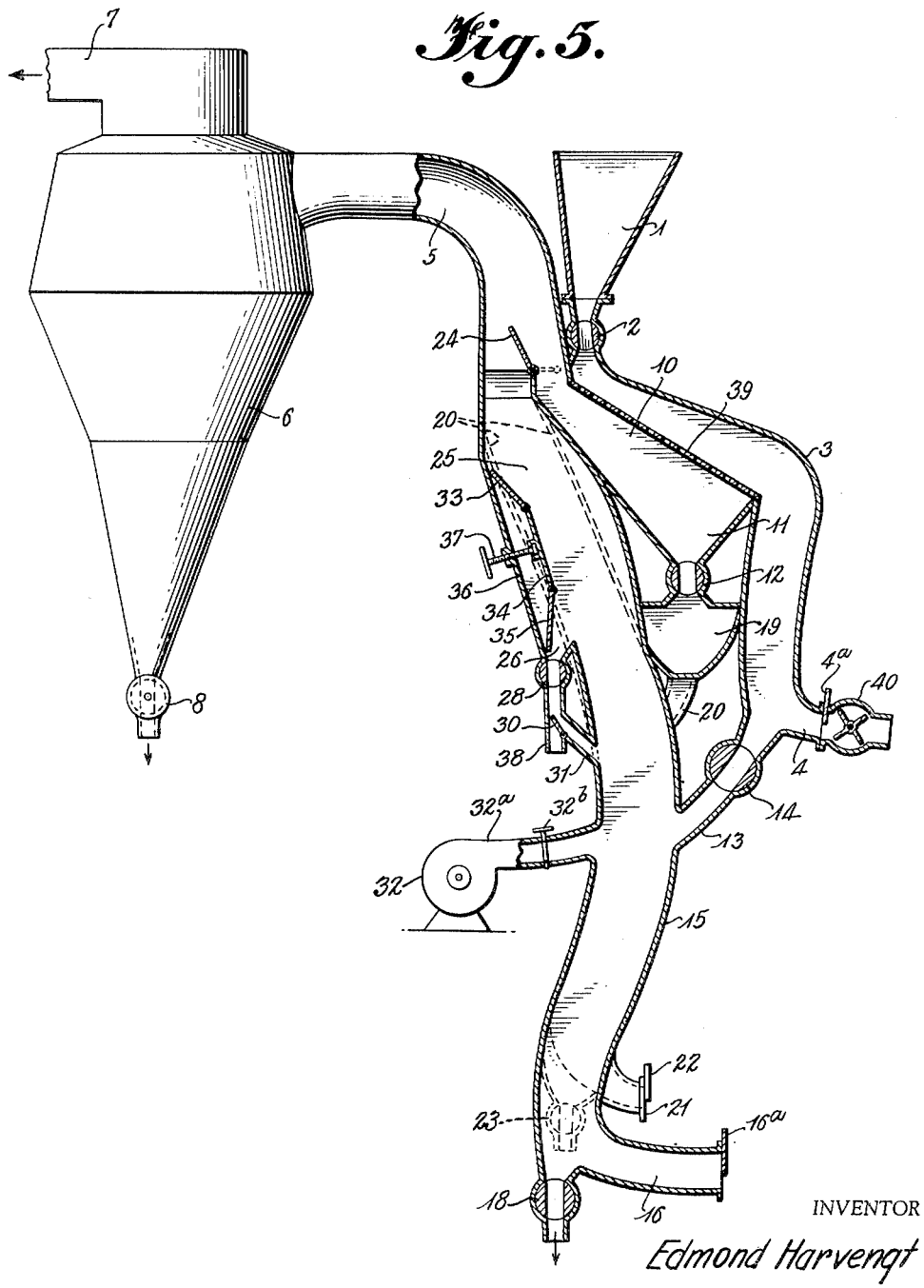

United States Patent Office 2,705,075
Patented Mar. 29, 1955

2,705,075

DRY DUST FREEING OF COALS AND SIMILAR MATERIALS

Edmond Harvengt, Moustier-sur-Sambre, Belgium, assignor to Link-Belt Company, Chicago, Ill., a corporation of Illinois Application February 5, 1951, Serial No. 209,364

16 Claims. (Cl. 209—139)

The invention concerns the dry, pneumatic dedusting of coals, and similar materials, and has for its primary object improvements in processes and apparatus for rendering coals, and similar materials, dust-free by removing therefrom, in separated condition, the fine and very fine particles, contained in the starting mixture, by means of currents of gaseous fluid.

It is well-known at this time to effect the separation of materials of different densities, or particle sizes, by causing the starting mixture to move in counter-current relationship with either an open or a closed circuit stream of gaseous fluid, such as cold or warm air, confined in a vertical or steeply inclined pipe or conduit, to cause the fluid stream to carry away the suspensible particles to a cyclone for final separation from the fluid. In such a process, however, to effect the separation of the very fine particles from the fine particles, it generally is necessary to use an excessive amount of gaseous fluid with the result that important quantities of the fine particles are delivered to the cyclone separator and, therefore, are not recoverable as a separate product. Attempts have been made to separate the fine particles from the very fine particles while the mixture of the same is moving along its final path to the cyclone but very limited beneficial results have been obtained.

Another process that has been employed for dedusting coals, and for separating the fine particles from the very fine particles, so that the fine particles could be reprocessed with the starting mixture of material, or could be remixed with the dedusted coal products, consists of agitating the materials by mechanically actuated means to open up or scatter the same and subjecting the materials, while in such condition, to the action of several gaseous fluid currents passing substantially at right angles through the materials. The difficulties experienced with this type of process were the degradation of the materials by the mechanically effected agitating and the need for complex, delicately adjustable apparatus for effecting such agitation.

A further object of the invention is to ensure effective dedusting of coals, and similar materials, with a limited consumption of power for producing the fluid current or currents and with simple apparatus, while avoiding excessive carrying of the usable fine particles toward the separating cyclone and undue breakage of the final products.

To this end, the invention comprises the dry dedusting of coals, and similar materials, with the aid of gaseous fluid currents, by the preliminary removal of the fine and most of the very fine particles from the desired coarse particles, hereinafter called grains, and the subjecting of the separated grains to a secondary, two-stage refining operation, performed in complementary gaseous fluid currents. The fine and very fine particles that are obtained by these preliminary and secondary operations, also, are subjected to further treatment in one or more fluid currents to effect their separation and final recovery.

According to another object of the invention, the preliminary removal of fine and very fine particles from the grains may be accomplished in part by subjecting the starting mixture, directly after its delivery to the apparatus, to repeated impact blows produced by cascading the material over a series of stepped blades, or by passing the material over a vibrating screen, while a flowing current of gaseous fluid is passed through the material.

Another object of the invention is to subject the mixture of fine and very fine particles, resulting from the aforesaid preliminary removal operation, to a further treatment which will separate the fine particles from the very fine particles and will divide the fine particles into different categories according to sizes. These different categories are then moved in countercurrent relationship through individual streams of gaseous fluid to remove any very fine particles that may have adhered to the fine particles. This preliminary or partial removal of fine and very fine particles from the grains, and the final freeing of these fine particles of the very fine particles that have adhered thereto, very materially reduces the work that must be performed by the fluid streams or currents used in the two-stage secondary refining of the grains.

Other objects of the invention will appear from the following more detailed description of certain preferred methods of carrying the invention into practice, together with certain arrangements of apparatus, given by way of examples, and illustrated by the accompanying drawings, in which:

Figure 1 is a partly sectional and partly elevational view of one type of apparatus employed for carrying out the invention, Figure 2 is a side elevational view taken at right angles to Fig. 1, Figures 3a, 3b, 3c, 3d, 3e and 3f, are cross-sectional views taken on line 3—3 of Fig. 1, and illustrates different conduit arrangements, Figure 4 is a similar view to Fig. 1 and illustrates a modified form of apparatus for carrying out the invention; and Figure 5 is a view similar to Fig. 1, and illustrates another modification of suitable apparatus embodying the invention.

Referring to the drawings, and first particularly to the apparatus of Figs. 1 and 2, the reference character 1 designates a feeding hopper for the starting mixture of materials to be treated. This hopper is provided at its bottom with an adjustable valve member 2 which discharges the materials into a substantially vertically extending conduit 3 that is provided toward its lower end with an opening 4, preferably provided with a movable shutter 4a, that enables the introduction to the conduit of a gaseous fluid, such as air, which may be cold or heated, according to the moisture content of the mixture of materials to be treated.

In its upper portion, the conduit 3 communicates with a second conduit 5 that leads to a separating cyclone 6, of any suitable type, which is connected at 7 with a suction fan, not shown, while the lower end of the cyclone is provided with a discharge device 8.

A part of the wall of the conduit 3 which faces the conduit 5 is cut away and the opening thereby provided has suitably mounted therein a series of stepped and downwardly inclined blades, the spacing and sloping of which may be adjustable. These blades are arranged in the path of the starting mixture of materials that is discharged from the hopper 1 and function to open up or spread out the particles of the materials as the latter cascade downwardly over the blades. Between the blades 9 and the inlet to the conduit 5 there is formed an expansion chamber 10, the lower portion of which is provided with one or several hoppers, two in the illustrated example, designated by the reference characters 11a and 11b. Each one of these hoppers is provided at its bottom with an adjustable valve device, designated 12a and 12b, respectively.

The conduit 3 terminates at its lower portion in an outlet passage 13, that is equipped with an adjustable valve device 14, and which opens at an intermediate level relative to the height of a second substantially vertically extending conduit 15 which has a lower inlet 16 for a gaseous fluid, such as air, which may be cold or heated, according to the moisture content of the starting mixture of materials to be treated. This inlet, preferably, is provided with an adjustable shutter 16a.

A discharge opening, having an adjustable valve device 18, is provided at the lower end of the conduit 15. At its upper end, the conduit 15 communicates with the conduit 5 that leads to the cyclone 6.

Passages 19a and 19b from the bottom of each one of the hoppers 11a and 11b ensures communication between said hoppers and conduits 20a and 20b which are provided with inlets 21a and 21b, see Fig. 2, for the admission of fluid, which may be either cold or heated. Movable shutters 22a and 22b, preferably, are associated with the inlets 21a and 21b while the conduits 20a and 20b, additionally, are provided with adjustable discharge devices 23a and 23b. Each one of the conduits 20a and 20b opens at its upper end into the upper portion of the conduit 15.

Preferably, at the upper end of the conduit 15, where it connects with the conduit 5 and the chamber 10, there is arranged a manually or mechanically operable flap valve 24 which enables the action of the suction fan, connected to the conduit 7, to be differentially adjusted relative to both the conduit 15 and the chamber 10 with its conduit 3.

An expansion chamber 25, conveniently of spiraled shape, is inserted in the conduit 5 and is designed for recovering the usable particles which may be carried by the fluid currents leaving the chamber 10 and the conduit 15. The lower portion of this expansion chamber 25 is provided with a hopper 26 which extends downwardly to a discharge conduit 27 provided with an adjustable valve device 28 and terminates in a discharge opening 29 equipped with a flap valve 30. A communicating branch conduit 31, controlled by the valve 30, is arranged between the conduits 27 and 15, as illustrated.

Finally, an auxiliary fan 32 is connected by branch pipe 32a to the conduit 15 at an intermediate level which may be about that of the passage 13. The branch pipe 32a is provided with a member 32b for controlling the flow of fluid therethrough.

The apparatus, as described, operates in the following manner:

The starting mixture of materials which are to be dedusted, and are fed to the hopper 1, discharge into the conduit 3 under the control of the valve 2. During the fall of the materials, the particles are spread out, or spaced, at least in part, as a result of cascading downwardly over the stepped blades 9. In this portion of the conduit 3, the opened-up or separated particles of the starting mixture are subjected to the action of a fluid current which flows upwardly through the conduit and is delivered thereto through its lower open end 4, with the result that the fine particles and a substantial portion of the very fine particles, are separated out and are carried to the chamber 10 through the interspaces between the blades 9. The grains of the starting mixture, together with the remaining very fine particles, continue their downward movement through the conduit 3 in countercurrent flow relationship to the fluid current that is flowing upwardly through the conduit. This upwardly flowing fluid current removes from the said grains most of the very fine particles that are still adhering to the grains, and these very fine particles are carried into the chamber 10 along with the initially separated fine and very fine particles. The grains, with any remaining small sized particles, are introduced through the passage 13, under the control of the valve 14, into the lower portion of the conduit 15 where they are subjected to the action of the fluid current entering this latter conduit through its inlet 16 in order to complete the removal of all of the remaining very fine particles from the grains. The completely cleaned grains are finally discharged at the lower end of the conduit 15 under the control of the valve device 18.

The fluid current passing upwardly through the conduit 15, in which the final stage of the grain refining operation takes place, reaches the top of this conduit and passes through the conduit 5 and the chamber 25 to the cyclone 6.

On the other hand, the expansion taking place in the chamber 10 effects a separation of the fine particles from the very fine particles and the separated fine particles are collected in categories of decreasing sizes in the hoppers 11b and 11a, respectively. The very fine particles that remain suspended in the fluid current are carried toward the conduit 5 and the cyclone 6.

From each of the hoppers 11a and 11b, the graded fine particles collected therein pass under the control of the corresponding valves 12a and 12b into the conduits 20a and 20b where they encounter fluid currents that enter the conduits through their inlets 21a and 21b under the control of the adjustable shutters 22a and 22b.

These fluid currents separate any remaining very fine particles from the fine particles and carry the very fine particles towards the upper portions of their respective conduits 20a and 20b. From the tops of these conduits, the fluid currents flow into the conduit 15 and therethrough towards the conduit 5 and the cyclone 6.

By a suitable actuation of the flap valve 24, the currents passing through the conduits 15, 20a and 20b, on the one hand, and through the conduit 3 and the chamber 10, on the other hand, may be differentially adjusted.

At the entrance to the conduit 5, all of the fluid currents carrying the small sized particles, which for the most part are very fine particles, are united and the resulting single current, while passing through expansion chamber 25, is freed of any fine particles that it still may be carrying. These separated fine particles pass into the hopper 26 and from it through the conduit 27, under the control of the valve 28 and the valve 30, either to the discharge 29, or into the conduit 15 through the branch 31. Any very fine particles that may pass into this intermediate portion of the conduit 15 are picked up and carried away by the fluid current towards the top of the said conduit 15, the conduit 5 and the cyclone 6.

The fine particles that are thus introduced into the conduit 15 are discharged with the grains through the outlet 18. The particles that fall through the lengths of the conduits 20a and 20b are discharged at the lower ends thereof through the control devices 23a and 23b, respectively.

In the example of Fig. 1, it has been assumed that the conduits 15, 20a and 20b are shaped in cross-section as illustrated in Fig. 3a. Such a cross-sectional shape is for the purpose of illustration only, and it is to be understood that the cross-sectional shapes illustrated in Figs. 3b, 3c and 3d may be employed when desired. Also, in this example, it has been assumed that the fine particles separated out in the expansion chamber 10 are divided into categories of different sizes. This is not essential for the hoppers 11a and 11b may be united into a single hopper, in which case only one conduit 20a or 20b would be provided for receiving and refining the particles collected in the single hopper.

Finally, instead of the fine particles, which are separated out in the expansion chamber 25, being introduced into the conduit 15, they may be introduced into the conduit 20a or 20b, whichever has received fine particles of substantially the same size.

The general arrangement of apparatus illustrated in Fig. 4 is substantially the same as that in Fig. 1, except that the expansion chamber 25 is so constructed that the volume thereof may be adjusted by providing at least one movable wall which may be formed of a set of hingedly connected panels with the free edges of the end panels 33 and 35 sliding on the wall 36 of the chamber while the central panel 34 is moved toward and away from the wall 36 by the action of any suitable member, such as the screw 37.

The fine particles which are separated out, in this modification of Fig. 4, in the expansion chamber 25 are collected in the hopper 26 and discharged at the lower end of the conduit 27 under the control of the valve 38.

In other respects, the operation of the Fig. 4 apparatus is the same as that of the apparatus of Fig. 1.

In the embodiment illustrated in Fig. 5, the preliminary separation of the fine and very fine particles from the starting mixture introduced by the hopper 1 is enhanced by passing the mixture over a sieve or screen 39, which has been illustrated as being fixed, but which can be rendered movable, and preferably vibratable, by any suitable mechanism, not shown. This sieve or screen is arranged within an opening that connects the upper end of the conduit 3 to the expansion chamber 10 which, of course, is arranged beneath the sieve and above the hopper 11. This expansion chamber communicates at its upper or outlet end with the conduit 5. In this modification, the fluid current issuing from the conduit 3 and the entrained fine and very fine particles pass downwardly through the openings of the sieve 39.

The fine and very fine particles are separated by the expansion taking place in the chamber 10 and the fine particles are collected in the hopper 11 from which they pass into the conduit 20 arranged in side-by-side relationship with the conduit 15. The conduit 20 has a fluid inlet 21 at its lower end portion which, preferably, is equipped with an adjustable shutter 22. At the extreme lower end of the conduit 20 is an adjustable device 23 which controls the discharge of the particles refined in the conduit. This latter conduit is connected at its upper end with the conduit 15 at a location below the flap valve 24.

The conduits 15 and 20 may have different shapes in cross-section, such as those illustrated in Figs. 3e and 3f.

Finally, the fine particles separated out in the expansion chamber 25 and collected in the hopper 26 may be discharged through the outlet 38 or they may be introduced, in their entirety or in part, into the conduit 15 to be subjected therein to additional refining, as has been explained with reference to the modifications of Figs. 1 and 2. In other respects, the arrangement and operation of the modifications of Fig. 5 are the same as those of the modifications previously described.

In all of the above modifications, if, due to very important changes in the composition of the mixture of starting material, the final refining of the grains in the conduit 15 and the separation of the different sized particles in such conduits as 20, 20a and 20b should become defective, the operator may start the auxiliary fan 32, and by appropriate settings of the members 32b, control the effective cross-sections of the branch pipes 32a and thereby restore in the considered conduit, or conduits, the desired refining conditions.

Although the above description has been directed specifically to certain embodiments only, it is to be understood that the invention is not to be so limited. Thus, in the preliminary stage of refining grains, a pulsatory fluid current can be used, the impulses being created by means of any suitable device, such as the rotatable valve 40 diagrammatically illustrated in Fig. 5.

I claim:

1. A dry process for dedusting coals and similar materials, comprising maintaining in a first vertically extending confined path an upwardly flowing current of gaseous fluid, delivering to the upper portion of said first fluid path to pass downwardly lengthwise thereof the starting mixture of grain sized particles and fine and very fine small sized particles so that the fine and most of the very fine small sized particles will be separated from the falling grain sized particles by the first rising fluid current, maintaining in a second vertically extending confined path an upwardly flowing current of gaseous fluid, delivering to the intermediate portion of said second fluid path to pass downwardly lengthwise of the remainder thereof the partially dedusted grain sized particles that reach the lower end portion of the said first fluid path so that the remaining very fine small sized particles will be separated from the falling grain sized particles by the second rising fluid current, partially expanding the fluid current leaving the upper portion of the first fluid path to separate therefrom most of the fine small sized particles suspended therein, delivering to the upper portion of the second fluid path, freed of the said expansion separated fine small sized particles, the partially expanded fluid current from the first fluid path so that the two fluid currents will mix, partially expanding the mixed fluid currents leaving the upper portion of the second fluid path to separate therefrom the fine small sized particles suspended therein, and finally separating from the partially expanded, mixed fluid currents the small sized particles still suspended therein.

2. A dry process for dedusting coals and similar materials, comprising maintaining in a first vertically extending confined path an upwardly flowing current of gaseous fluid, delivering at a controlled rate to the upper portion of said first fluid path to pass downwardly lengthwise thereof the starting mixture of grain sized particles and fine and very fine small sized particles so that the fine and most of the very fine small sized particles will be separated from the falling grain sized particles by the first rising fluid current, maintaining in a second vertically extending confined path an upwardly flowing current of gaseous fluid, delivering at a controlled rate to the intermediate portion of said second fluid path to pass downwardly lengthwise of the remainder thereof the partially dedusted grain sized particles that have passed beyond the lower portion of the said first fluid path so that the remaining very fine small sized particles will be separated from the falling grain sized particles by the second rising fluid current, partially expanding the fluid current leaving the upper portion of the first fluid path to separate therefrom most of the fine small sized particles suspended therein, delivering to the upper portion of the second fluid path, freed of the said expansion separated fine small sized particles, the partially expanded fluid current from the first fluid path so that the two fluid currents will mix, partially expanding the mixed fluid currents leaving the upper portion of the second fluid path to separate therefrom the fine small sized particles suspended therein, returning to an intermediate portion of the second fluid path any desired amount of the fine small sized particles that are separated from the mixed fluid currents by the said partial expansion thereof, and finally separating from the partially expanded, mixed fluid currents the small sized particles still suspended therein.

3. A dry process for dedusting coals and similar materials, comprising maintaining in a first vertically extending confined path an upwardly flowing current of gaseous fluid, delivering to the upper portion of said first fluid path to pass downwardly lengthwise thereof the starting mixture of grain sized particles and fine and very fine small sized particles so that the fine and most of the very fine small sized particles will be separated from the falling grain sized particles by the first rising fluid current, subjecting said starting mixture to repeated impact blows directly after its delivery to assist the fluid current in effecting separation of the small sized particles from the grain sized particles, maintaining in a second vertically extending confined path an upwardly flowing current of gaseous fluid, delivering to the intermediate portion of said second fluid path to pass downwardly lengthwise of the remainder thereof the partially dedusted grain sized particles that reach the lower portion of said first fluid path so that the remaining very fine small sized particles will be separated from the falling grain sized particles by the second rising fluid current, partially expanding the fluid current leaving the upper portion of the first fluid path to separate therefrom most of the fine small sized particles suspended therein, subjecting the fine small sized particles thus separated by partial expansion to a further separating action by an upwardly flowing fluid current, delivering to the upper portion of the second fluid path, freed of the said expansion separated fine small sized particles, the partially expanded fluid current from the first fluid path so that the two fluid currents will mix, partially expanding the mixed fluid currents leaving the upper portion of the second fluid path to separate therefrom the fine small sized particles suspended therein, and finally separating from the partially expanded, mixed fluid currents the small sized particles still suspended therein.

4. A dry process for dedusting coals and similar materials, comprising maintaining in a first vertically extending confined path an upwardly flowing current of gaseous fluid, delivering at a controlled rate to the upper portion of said first fluid path to pass downwardly lengthwise of the starting mixture of grain sized particles and fine and very fine small sized particles so that the fine and most of the very fine small sized particles will be separated from the falling grain sized particles by the first fluid current, subjecting said starting mixture to repeated impact blows directly after its delivery to assist the fluid current in effecting the separating action, maintaining in a second vertically extending confined path an upwardly flowing current of gaseous fluid, delivering at a controlled rate to the intermediate portion of said second path to pass downwardly lengthwise of the remainder thereof the partially dedusted grain sized particles that have passed beyond the lower portion of said first fluid path so that the remaining very fine small sized particles will be separated from the grain sized particles by the second rising fluid current, removing the dedusted grain sized particles from the lower portion of the second fluid current, partially expanding the fluid current leaving the upper portion of the first fluid path to separate therefrom most of the fine small sized particles suspended therein, subjecting the fine small sized particles thus separated by partial expansion to a further separating action by an upwardly flowing fluid current, delivering to the upper portion of the second fluid path, freed of the said expansion separated fine small sized particles, the partially expanded fluid current from the first fluid path so that the two fluid currents will mix, partially expanding the mixed fluid currents leaving the upper portion of the second fluid path to separate therefrom the fine small sized particles suspended therein, returning to an intermediate portion of the second fluid path any desired amount of the fine small sized particles that are separated from the mixed fluid currents by the said partial expansion thereof, and finally separating from the partially expanded, mixed fluid currents the small sized particles still suspended therein.

5. A dry process for dedusting coals and similar materials, comprising removing from the grain sized particles of the starting materials to be treated a portion of the small sized particles comprising the fine and most of the very fine particles, subjecting the resulting grain sized particles to two stages of complementary separating action including a preliminary stage effected by its prolonged counter-current movement relative to an upwardly flowing fluid current and a final stage effected by its prolonged counter-current movement relative to another upwardly flowing fluid current, separating the fine particles from the very fine particles of the said removed small sized particles, and introducing controlled quantities of the said separated fine particles into at least one separate fluid current for prolonged counter-current flow therein to eliminate therefrom the very fine particles that still may be contained therein.

6. A dry process for dedusting coals and similar materials, comprising initially subjecting the starting mixture of materials to be treated to the action of a fluid current to separate from the grain sized particles of said mixture a portion of the small sized particles comprising the fine and most of the very fine particles, subjecting the resulting grain sized particles to two stages of complementary separating action including a preliminary stage effected by its prolonged counter-current movement relative to an upwardly flowing fluid current and a final stage effected by its prolonged counter-current movement relative to another upwardly flowing fluid current, separating the fine particles from the very fine particles of the said portion of small sized particles by partial expansion of the first named fluid current, and introducing controlled quantities of the said separated fine particles into at least one additional fluid current for prolonged counter-current flow therein to separate therefrom the very fine particles that still may be contained therein.

7. A process as in claim 6 including dividing the fine particles separated from the very fine particles into categories of different sizes, and subjecting each of said categories to a separate complementary treatment to separate therefrom the very fine particles that still may be contained therein.

8. A process as in claim 6 comprising uniting into a single flowing fluid current all of the fluid currents employed for effecting the several separating actions, and expanding said single fluid current to separate from the fluid the solid particles still suspended therein.

9. A process as in claim 6 comprising uniting in variable quantities into a single flowing fluid current the fluid currents employed for effecting the initial separation of the starting mixture of materials and for effecting the preliminary separating stage of the said resulting grain sized particles with the fluid currents employed for effecting the final separation stage of the said resulting grain sized particles and for effecting the separation of the fine and very fine particles, and expanding said single flowing current to separate from the fluid thereof the solid particles still suspended therein.

10. A process as in claim 6, comprising uniting into a single flowing fluid current all of the fluid currents employed for effecting the several separating actions, partially expanding said single flow fluid current to separate from the fluid thereof the fine particles suspended therein, and returning the fine particles separated from the single fluid current to the fluid current employed for effecting the final separation stage of the said resulting grain sized particles.

11. Apparatus for dedusting coals and similar materials, comprising a first substantially vertical conduit, means for delivering to the upper portion of said conduit to pass downwardly lengthwise thereof the starting mixture of grain sized particles and fine and very fine small sized particles, means for admitting fluid to the lower portion of said first conduit to create an upwardly flowing current therein which will separate the fine and most of the very fine small sized particles from the grain sized particles during the passage of the latter downwardly through said conduit, a second substantially vertical conduit, means for delivering to the intermediate portion of the second conduit to pass downwardly lengthwise of the remainder thereof the partially dedusted grain sized particles that reach the lower portion of the first conduit, means for admitting fluid to the lower portion of the second conduit to create an upwardly flowing current therein which will separate the remaining very fine small sized particles from the grain sized particles during the downward passage of the latter through the second conduit, an expansion chamber forming the only connection between the upper portions of said first and second conduits for separating fine small sized particles from the fluid current flowing therethrough from the first conduit to the second conduit, a cyclone separator for removing small sized particles from the fluid flowing therethrough, a connection between the upper portion of the said second conduit and the cyclone separator, and means forming an expansion chamber in the said connection for separating fine small sized particles from the fluid current flowing to the cyclone separator.

12. Apparatus for dedusting coals and similar materials, comprising a first substantially vertical conduit, means for delivering to the upper portion of said conduit to pass downwardly lengthwise thereof the starting mixture of grain sized particles and fine and very fine small sized particles, means for admitting fluid to the lower portion of said first conduit to create an upwardly flowing current therein which will separate the fine and most of the very fine small sized particles from the grain sized particles during the passage of the latter downwardly through said conduit, a second substantially vertical conduit, means for delivering to the intermediate portion of the second conduit to pass downwardly lengthwise of the remainder thereof the partially dedusted grain sized particles that reach the lower portion of the first conduit, means for admitting fluid to the lower portion of the second conduit to create an upwardly flowing current therein which will separate the remaining very fine small sized particles from the grain sized particles during the downward passage of the latter through the second conduit, means for removing the dedusted grain sized particles from the lower portion of the second conduit, a chamber connecting the upper portions of said first and second conduits in which the fluid current leaving the first conduit is partially expanded to release the fine small sized particles entrained therein, a cyclone separator for removing small sized particles from the fluid flowing therethrough, a connection between the upper portion of the said second conduit and the cyclone separator, means forming an expansion chamber in said connection for separating fine small sized particles from the fluid current flowing to the cyclone separator, and means for returning to an intermediate portion of the second conduit controlled amounts of the fine small sized particles separated from the fluid current flowing through the last mentioned expansion chamber.

13. Apparatus for dedusting coals and similar materials, comprising a first substantially vertical conduit, means for delivering to the upper portion of said conduit to pass downwardly lengthwise thereof the starting mixture of grain sized particles and fine and very fine small sized particles, means for admitting fluid to the lower portion of said first conduit to create an upwardly flowing current therein which will separate the fine and most of the very fine small sized particles from the grain sized particles during the passage of the latter downwardly through said conduit, a second substantially vertical conduit, means for delivering to the intermediate portion of the second conduit to pass downwardly lengthwise of the remainder thereof the partially dedusted grain sized particles that reach the lower portion of the first conduit, means for admitting fluid to the lower portion of the second conduit to create an upwardly flowing current therein which will separate the remaining very fine small sized particles from the grain sized particles during the downward passage of the latter through the second conduit, an expansion chamber forming the only connection between the upper portions of said first and second conduits for separating fine small sized particles from the fluid current flowing through the chamber from the first conduit to the second conduit, a cyclone separator for removing small sized particles from the fluid flowing therethrough, a connection between the upper portion of the said second conduit and the cyclone separator, means forming an expansion chamber in the said connection for separating fine small sized particles from the fluid current flowing to the cyclone separator, a third substantially vertical conduit connected at its upper end to the upper portion of the second conduit, means for delivering to the intermediate portion of the third conduit the fine small sized particles separated from the fluid current passing through the first mentioned expansion chamber, and means for admitting fluid to the lower portion of the third conduit to create an upwardly flowing current therein.

14. Apparatus for dedusting coals and similar materials, comprising a first substantially vertical conduit having a side discharge opening adjacent its upper end, a series of vertically spaced and stepped baffle members arranged in said opening, a hopper for delivering the starting mixture of grain sized particles and fine and very fine small sized particles to the upper end of the first conduit so that the said particles will impinge against said baffle members in passing downwardly through the upper portion of said conduit, means for admitting fluid to the lower portion of said first conduit to create an upwardly flowing current therein which will separate the fine and most of the very fine small sized particles from the grain sized particles and will carry the separated small sized particles through said discharge opening, a second substantially vertical conduit, means for delivering to the intermediate portion of the second conduit to pass downwardly lengthwise of the remainder thereof the partially dedusted grain sized particles that reach the lower portion of the first conduit, means for admitting fluid to the lower portion of the second conduit to create an upwardly flowing current therein which will separate the remaining very fine small sized particles from the grain sized particles during the downward passage of the latter through the second conduit, a chamber connected to the upper portion of the second conduit and communicating with the first conduit through its said discharge opening in which the fluid current leaving the first conduit is partially expanded to release the fine small sized particles entrained therein, a cyclone separator for removing small sized particles from the fluid flowing therethrough, a connection between the upper portion of the said second conduit and the cyclone separator, and means forming an expansion chamber in said connection for separating fine small sized particles from the fluid current flowing to the cyclone separator.

15. Apparatus as in claim 14, further characterized by the first mentioned expansion chamber having a pair of hoppers formed in its lower portion to receive the fine small sized particles that are released in said chamber, a pair of auxiliary substantially vertical conduits connected at their upper ends to the upper portion of the second conduit, means for delivering to the intermediate portions of said auxiliary conduits the fine small sized particles received in the hoppers of the expansion chamber, and means for admitting fluid to the lower portion of each one of said auxiliary conduits to create an upwardly flowing current therein.

16. Apparatus for dedusting coal and similar materials, comprising a first substantially vertical conduit having a discharge opening in one wall adjacent the upper end of the conduit, a sieve bridging said discharge opening, a hopper for delivering the starting mixture of grain sized particles and fine and very fine small sized particles to the upper end of the first conduit so that the said particles will travel over said sieve in passing downwardly through the upper portion of the conduit, means for admitting fluid to the lower portion of said first conduit to create an upwardly flowing current therein which will separate the fine and most of the very fine small sized particles from the grain sized particles during their passage over the sieve and downwardly through said conduit, a second substantially vertical conduit, means for delivering to the intermediate portion of the second conduit to pass downwardly lengthwise of the remainder thereof the partially dedusted grain sized particles that reach the lower portion of the first conduit, means for admitting fluid to the lower portion of the second conduit to create an upwardly flowing current therein which will separate the remaining very fine small sized particles from the grain sized particles during the downward passage of the latter through the second conduit, a chamber connected to the upper portion of the second conduit and communicating with the first conduit through said sieve, said chamber causing the fluid current discharged therethrough from the first conduit to partially expand to release the fine small sized particles, a cyclone separator for removing small sized particles from the fluid flowing therethrough, a connection between the upper portion of the said second conduit and the cyclone separator, and means forming an expansion chamber in the said connection for separating fine small sized particles from the fluid current flowing to the cyclone separator.

References Cited in the file of this patent

UNITED STATES PATENTS

| 69,784 | Dewall | Oct. 15, 1867 |
| 845,870 | Hedfeldt | Mar. 5, 1907 |
| 1,787,759 | Patton | Jan. 6, 1931 |
| 1,791,673 | Karlson | Feb. 10, 1931 |
| 1,850,750 | Lessing | Mar. 22, 1932 |
| 1,895,771 | Roalfe | Jan. 31, 1933 |
| 1,912,910 | Neuman | June 6, 1933 |
| 1,945,771 | Dahlstrom | Feb. 6, 1934 |
| 1,977,479 | Hebley | Oct. 16, 1934 |
| 2,000,181 | Lessing | May 7, 1935 |
| 2,130,880 | Durning | Sept. 20, 1938 |
| 2,386,975 | Pearce | Oct. 16, 1945 |

FOREIGN PATENTS

| 37,009 | Netherlands | Dec. 16, 1935 |
| 358,329 | Great Britain | Oct. 8, 1931 |
| 413,294 | Great Britain | July 11, 1934 |
| 474,557 | Great Britain | Nov. 3, 1937 |
| 511,602 | Germany | Oct. 31, 1930 |
| 609,029 | Great Britain | Sept. 24, 1948 |
| 828,904 | France | June 3, 1938 |

OTHER REFERENCES

Transactions of the Institute of Mining Engineers, vol. LXXXIX, part 6, pages 298–334; published by A. Reid & Co. Ltd., Newcastle upon Tyne, England, 1935. (Copy in Division 55.)